(12) United States Patent
Urquizo et al.

(10) Patent No.: US 8,634,524 B2
(45) Date of Patent: *Jan. 21, 2014

(54) DEVICES, SOFTWARES AND METHODS FOR SELECTIVELY LIMITING THE TOTAL MODEM-ON-HOLD TIMEOUT TIME OF A SINGLE LOG-IN SESSION

(75) Inventors: Alex Urquizo, Medford, MA (US); Vincent T. Grove, Concorde, MA (US)

(73) Assignee: Cisco Technology, Inc., San Jose, CA (US)

( * ) Notice: Subject to any disclaimer, the term of this patent is extended or adjusted under 35 U.S.C. 154(b) by 1839 days.

This patent is subject to a terminal disclaimer.

(21) Appl. No.: 11/456,070

(22) Filed: Jul. 6, 2006

(65) Prior Publication Data

US 2006/0248164 A1    Nov. 2, 2006

Related U.S. Application Data

(63) Continuation of application No. 09/966,927, filed on Sep. 27, 2001, now Pat. No. 7,095,831.

(51) Int. Cl.
*H04M 11/00* (2006.01)

(52) U.S. Cl.
USPC ............... 379/93.35; 379/93.28; 370/352; 375/222

(58) Field of Classification Search
USPC ......... 379/93.35, 93.28, 93.31, 93.09, 93.01, 379/215.01; 370/352; 375/222
See application file for complete search history.

(56) References Cited

U.S. PATENT DOCUMENTS

| | | | |
|---|---|---|---|
| 6,263,016 B1 | 7/2001 | Bellenger et al. | |
| 6,345,088 B1 | 2/2002 | Gu et al. | |
| 6,377,668 B1 | 4/2002 | Smock et al. | |
| 6,426,946 B1 | 7/2002 | Takagi et al. | |
| 6,650,741 B1 * | 11/2003 | Urquizo et al. | 379/93.28 |
| 6,690,776 B1 | 2/2004 | Raasch | |
| 6,912,276 B1 | 6/2005 | Olafsson et al. | |
| 7,177,408 B1 | 2/2007 | Urquizo et al. | |

* cited by examiner

*Primary Examiner* — Melur Ramakrishnaiah
(74) *Attorney, Agent, or Firm* — Edwards Wildman Palmer LLP; James M. Behmke; Stephen D. LeBarron

(57) ABSTRACT

A method includes establishing a modem connection, receiving an on-hold request over the modem connection, comparing a cumulative time that the modem connection has been on hold to a threshold value, and resolving the on-hold request based upon the comparison.

18 Claims, 5 Drawing Sheets

| USER DATABASE | DB2 |
|---|---|
| USER NAME | LOG-IN SESSION TIMEOUT TIME LIMIT (SEC) |
| USER1 | 120 |
| USER2 | 240 |
| USER3 | 60 |
| ... | ... |

| MH bits LSB:MSB | | | |
|---|---|---|---|
| 0:3 | Fill bits: 1111 | | |
| 4:11 | Frame sync: 01110010, where the left-most bit is first in time | | |
| 12:15 | Signal indication bits: | | |
| | 0011 | Mhreq | Request remote modem to go on-hold |
| | 0101 | Mhack | Indicate agreement to go on hold and timeout |
| | 0111 | Mhnack | Deny on-hold, request cleardown or fast reconnect |
| | 1001 | MHclrd | Request cleardown |
| | 1011 | Mhcda | Acknowledge cleardown |
| | 1101 | MHfrr | Request fast reconnect |
| 16:19 | Information bits:<br>For signals Mhreq, ~~Mhnack~~, MHcda and MHfrr repeat signal indication bits<br>For Mhack: | | |
| | 16:19 | T1 – Timeout period for on-hold | |
| | For MHclrd: | | |
| | 16:19 | 0101 Cleardown due to incoming call<br>0110 Cleardown due to outgoing call<br>1010 Cleardown due to other reason | |
| | For Mhnack: | | |
| | 16:19 | 0101 Modem on Hold denied. Subsequent requests will be denied until current modem session terminates.<br>0111 Modem on Hold denied. Try again later. | |
| 20:35 | CRC | | |
| 36:39 | Fill bits: 1111 | | |
| NOTE 1 - Bit combinations not defined in bits 12-15 are reserved for the ITU. MH sequences with undefined bit combinations should be ignored.<br>NOTE 2 - Bit combinations not defined in bits 16-19 for MHclrd and Mhnack are reserved for the ITU and should not be interpreted by the receiving modem. | | | |

FIG. 4

DEVICES, SOFTWARES AND METHODS FOR SELECTIVELY LIMITING THE TOTAL MODEM-ON-HOLD TIMEOUT TIME OF A SINGLE LOG-IN SESSION

CROSS REFERENCE TO RELATED APPLICATIONS

This application is a continuation of prior application Ser. No. 09/966,927, which was filed on 27 Sep. 2001. U.S. patent application Ser. No. 09/966,927 is incorporated by reference in its entirety.

BACKGROUND

1. Technical Field

This disclosure relates to the field of modems and network servers, and more specifically to modems and servers that can request a Modem-On-Hold and can deny such a request under certain conditions.

2. Description of the Related Art

Networks, such as the internet, are increasingly used for communications. Typically a user subscribes with an Internet Service Provider ("ISP") that is connected to the internet. The user has a host device, such as a personal computer. The host device can communicate over a telephone line with a network device of the ISP, such as a server. Then the user and the ISP exchange data over the modem connection, typically in binary form.

The host device includes a modem, which communicates over the telephone line. The server has individual ports, one for each user that calls in with a modem to log in.

Recently modems that are made according to the International Telecommunications Union (ITU) V.92 standard provide a new feature, which is called the Modem-On-Hold ("MOH"). The modem sends a MOH request to temporarily discontinue ("place on hold") the modem connection. The server receives the MOH request, and grants it by temporarily discontinuing the modem connection.

The MOH feature is useful to the user, because the telephone line is temporarily released. Then it can be used to receive an incoming call, or to place an outgoing call.

The MOH feature, however, is detrimental to the internet service provider. While the modem connection is temporarily discontinued, the port assigned to it by the server remains committed to the user, but unused. As such, it may not be assigned to another user. A number of users could abuse the privilege, employing the MOH feature many times in a single log-in session.

Embodiments of the invention address these and other disadvantages of the related art.

SUMMARY

Generally speaking, embodiments of the invention include devices, softwares and methods for selectively limiting the total modem-on-hold timeout time of a single log-in session.

According to some embodiments, a network switch counts the cumulative time spent during individual MOH sessions of a user. Once a limit is exceeded, then subsequent MOH requests are denied. This results in network switches that make more effective use of their ports.

This and other features and advantages of the invention will become more readily apparent from the following Detailed Description, which proceeds with reference to the drawings, in which:

BRIEF DESCRIPTION OF THE DRAWINGS

FIG. 4 is a table showing proposed adaptations to an ITU recommendation for implementing the invention.

DETAILED DESCRIPTION OF THE PREFERRED EMBODIMENT(S)

As has been mentioned, the invention provides devices, softwares and methods for selectively limiting the total modem-on-hold timeout time of a single log-in session. The invention is now described in more detail.

Figure 1A:
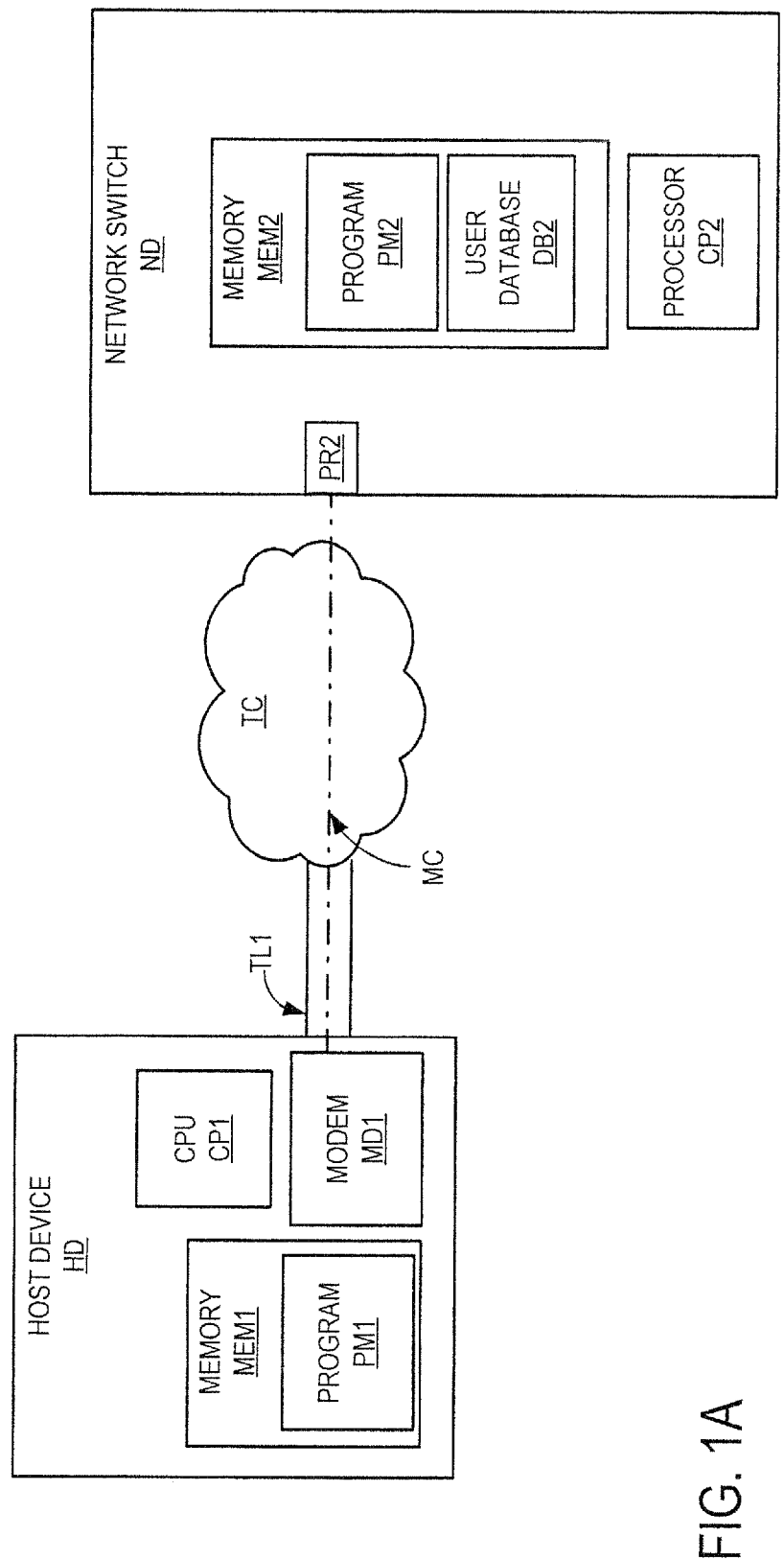
FIG. 1A is a diagram showing a host device made according to an embodiment of the invention communicating with a network device made according to an embodiment of the invention.

Referring now to FIG. 1A, an arrangement is shown of a host device HD communicating with a network switch ND, both of which are made according to the invention. It will be understood that FIG. 1A shows only one of many possible arrangements. For example, host device HD may also communicate with a server that is not made according to the invention. Moreover, network switch ND may be accessed by a personal computer that is not made according to the invention.

Host device HD may be a personal computer. It includes a Central Processing Unit ("CPU") CP1, and a memory MEM1. CPU CP1 executes a program PM1 that resides on memory MEM1.

Importantly, host device HD includes a modem MD1. Modem MD1 is connected via a telephone line TL1 to the telephone cloud TC, which is also known as the telephone network.

Network switch ND may be any network switch, such as a server, a router, a gateway, a bridge, etc. Switch ND has at least one port PR2 for interfacing with the telephone cloud TC. Port PR2 may be directly coupled with another internal modem (not shown) of switch ND, etc., as is known in the art.

Switch ND also has a processor CP2. Processor CP2 may be implemented as a Digital Signal Processor (DSP), Central Processing Unit (CPU), or any other equivalent way known in the art.

Switch ND additionally includes a memory MEM2, on which a program PM2 may reside. Functions of processor CP2 may be controlled by program PM2, as will become apparent from the below. In addition, memory MEM2 includes a user database DB2, which may include user attributes.

Figures 1B, 1C:
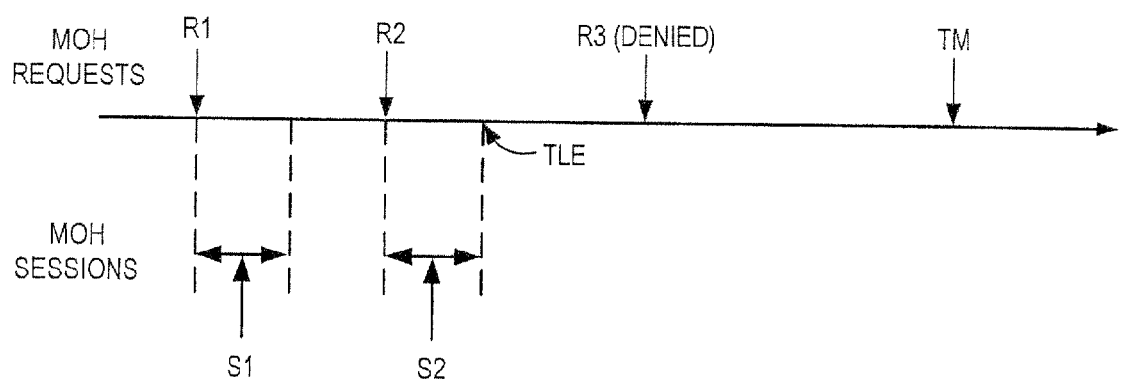
FIG. 1B is a diagram of a memory arrangement in the network device of FIG. 1A.
FIG. 1C is a time diagram for illustrating an operation of the invention.

Referring now to FIG. 1B, user database DB2 is described in more detail. Different users are assigned different modem-on-hold timeout time limits. This part of the invention may be accomplished by making the hold timeout time limits part of the user profile, and relying on the fact that the users have different profiles to begin with. It will be understood that, if network switch ND is implemented by more than one device, portions of user database DB2 may be distributed among such devices.

Returning to FIG. 1A, host device HD is able to establish a modem connection MC with network switch ND. The modem connection MC is from modem MD1 of host device HD, over telephone line TL1.

Host device HD is able to receive a line request. The line request may be directly from the user, or may be automated, e.g. when a call is incoming over telephone line TL1. The line request is for another use of telephone line TL1. More particularly, the line request is for temporarily releasing telephone line TL1, by temporarily placing modem connection MC on hold. Pursuant to the line request, host device HD first generates a Modem-On-Hold (MOH) request. The MOH request is transmitted via modem connection MC to network switch ND.

Network switch ND is capable of receiving the MOH request. The first time the MOH request is received, it is granted, which starts an individual MOH session. This way the line request may be accommodated. Alternately, depending on the settings and other arrangements, even the first MOH request may be denied.

Network switch ND also has a timer for measuring a cumulative duration of the individual durations of the individual MOH sessions. The timer is started when the first MOH request is granted. The timer is optionally stopped when modem connection MC is restored, as the individual MOH session ends. The timer is restarted upon granting the second MOH request, and so on. But, if during the first or a subsequent MOH individual session a log-in session timeout time limit is reached or exceeded, then the next MOH request is simply not granted.

In addition, network switch ND may optionally transmit a warning message to that effect to host device HD. The warning may be that the next MOH request will be ignored. An additional feature may be that a reason may be given, such as "Total timeout time exceeded."

Host device HD is optionally able to receive the warning message. Once it receives it, the next line request does not result in an MOH request.

Referring to FIG. 1C, the invention is explained along a time axis TM, which shows the times when MOH requests R1, R2, R3 are made. Requests R1, R2 are granted, resulting in respective MOH sessions S1, S2. In the example of FIG. 1C, second session S2 ends at point TLE, which is the point where the sum of the durations S1, S2 reaches the total cumulative timeout limit. Accordingly, request R3 is denied.

The invention may be implemented by one or more devices that include logic circuitry. The device performs functions and/or methods as are described in this document. The logic circuitry may include a processor that may be programmable for a general purpose, or dedicated, such as microcontroller, a microprocessor, a Digital Signal Processor (DSP), etc. For example, the device may be a digital computer like device, such as a general-purpose computer selectively activated or reconfigured by a computer program stored in the computer.

Moreover, the invention additionally provides methods, which are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases there should be borne in mind the distinction between the method of the invention itself and the method of operating a computing machine. The invention relates both to methods in general, and also to steps for operating a computer and for processing electrical or other physical signals to generate other desired physical signals.

The invention additionally provides programs, and methods of operation of the programs. A program is generally defined as a group of steps leading to a desired result, due to their nature and their sequence. A program made according to an embodiment of the invention is most advantageously implemented as a program for a computing machine, such as a general-purpose computer, a special purpose computer, a microprocessor, etc.

The invention also provides storage media that, individually or in combination with others, have stored thereon instructions of a program made according to the invention. A storage medium according to the invention is a computer-readable medium, such as a memory, and is read by the computing machine mentioned above.

The steps or instructions of a program made according to an embodiment of the invention requires physical manipulations of physical quantities. Usually, though not necessarily, these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the invention.

Often, for the sake of convenience only, it is preferred to implement and describe a program as various interconnected distinct software modules or features, individually and collectively also known as software and softwares. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

Figure 2:
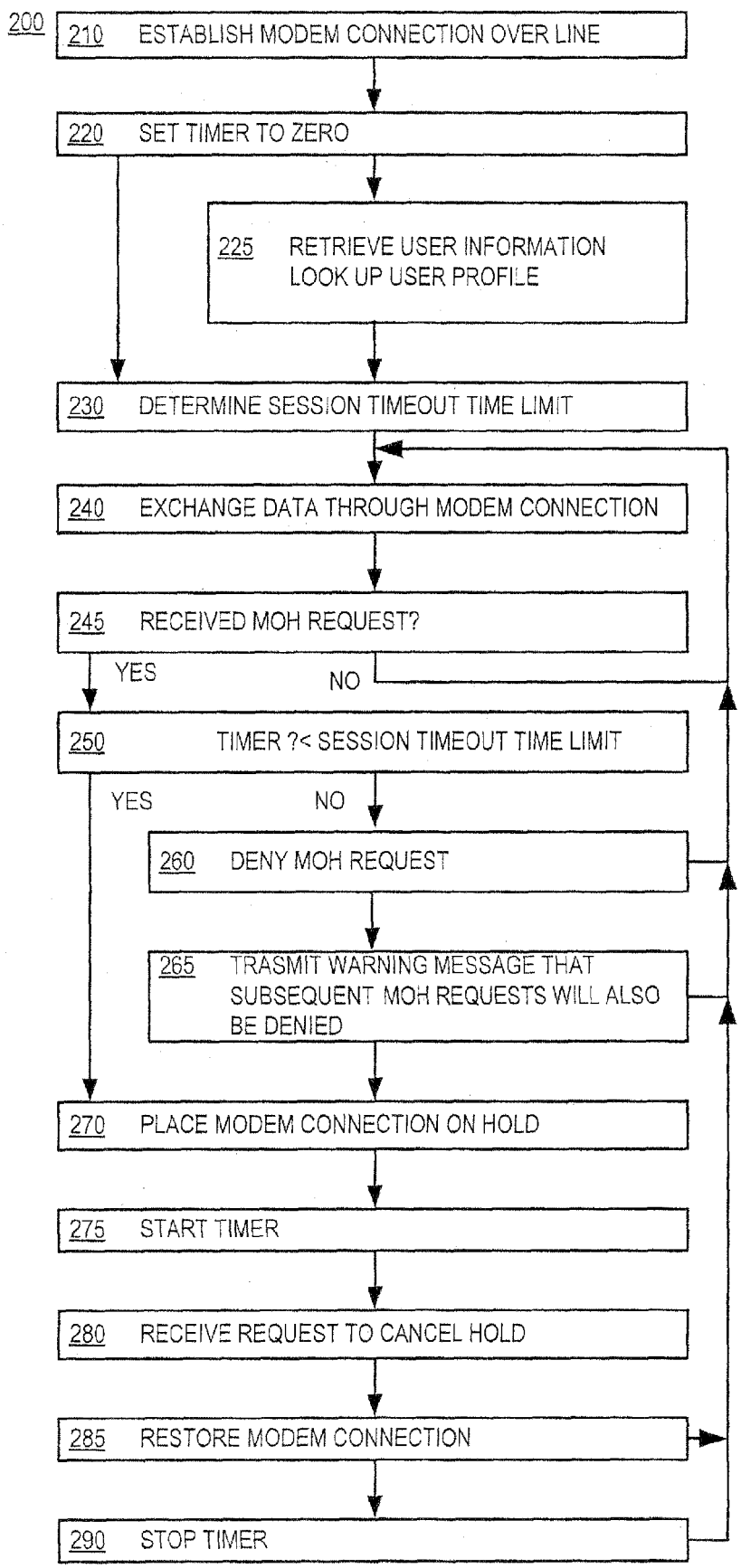
FIG. 2 is a flowchart illustrating methods according to embodiments of the invention.

Referring now to FIG. 2, a flowchart 200 is used to illustrate a method according to an embodiment of the invention. The method of flowchart 200 may also be practiced by network switch ND of FIG. 1A. Or it may be equivalently practiced by a combination of cooperating network switches, such as an access server and a controlling server. The controlling server may be one that performs Remote Dial-In User Service.

According to a box 210, a modem connection MC is established with a modem over a telephone line. This starts a log-in session. Authentication and authorization processes are performed at this time, by entering a user identification, a password, etc. These received data serve to identify the user.

The data exchange may serve to identify the users of the first and second modems. Identification may take place by using an Authentication, Authorization, and Accounting (AAA) server, although the invention is not limited in this regard. Such an AAA server usually performs these AAA functions by interacting with network access or gateway devices and databases and directories containing user information. The interaction may be by according to a suitable standard. An example of such a standard today is the RADIUS (Remote Authentication Dial In User Service) standard.

According to an optional next box 220, a timer is set to zero. It will be understood that the preferred implementation of a timer is by simply keeping track of a new time variable.

According to an optional next box 230, a log-in session timeout time limit is determined. This would be a new attribute in the protocol, according to the present invention. The log-in session timeout time limit may be a default maximum timeout value, specified through the appropriate tool, such as modemcaps.

Modemcaps is an informal name for a database that contains elements of a modem capability. The database is used to configure the modem, usually when it becomes idle.

Alternately, the time limit may be determined according to an optional box 225, by looking up data about the identified user. The data may include a user profile, stored in a database of the network switch. Each user may have a different log-in session timeout time limit, for example according to the subscription agreement with the ISP. These may be performed during the authentication and authorization processes.

In the event the method of the invention is being performed by cooperating network switches, the controlling server sends to the access server a Modem-On Hold attribute. Then this data will be sent to a registration, admission, and status protocol platform of the remote access server (RAS). A RAS platform is a remote access server, access gateway, or any device that contains features for terminating a modem session or a voice session.

According to an optional next box 240, data is exchanged with the modem over the modem connection.

According to an optional next box 245, it is inquired whether a MOH request has been received. While not, execution returns to box 240.

If a MOH request is received at box 245, then according to an optional next box 250, it is determined whether the timer has reached a time less than a preset log-in session timeout time limit. If not, then according to an optional next box 260, the MOH request is denied. Plus a reason may be given, such as "total timeout time exceeded". Execution may then return to box 240. Or execution may first proceed to an optional next box 265, where a warning message is transmitted. The warning message may be that subsequent MOH requests will be denied. The warning message might not be heeded, however, if a receiving host device is not made to understand it.

The first time box 250 is encountered, the answer will be yes. If yes, according to an optional next box 270 the MOH request is granted. The modem connection is placed on hold.

According to a next box 275, the timer is started.

According to an optional next box 280, a request is received to cancel the hold, by restoring the modem connection.

According to a next box 285, the modem connection is restored, thus ending the individual MOH session. Execution may then return to box 240.

Alternately, according to an optional next box 290, the timer may be stopped. This way the timer keeps track of the cumulative durations of the individual MOH sessions.

Figure 3:
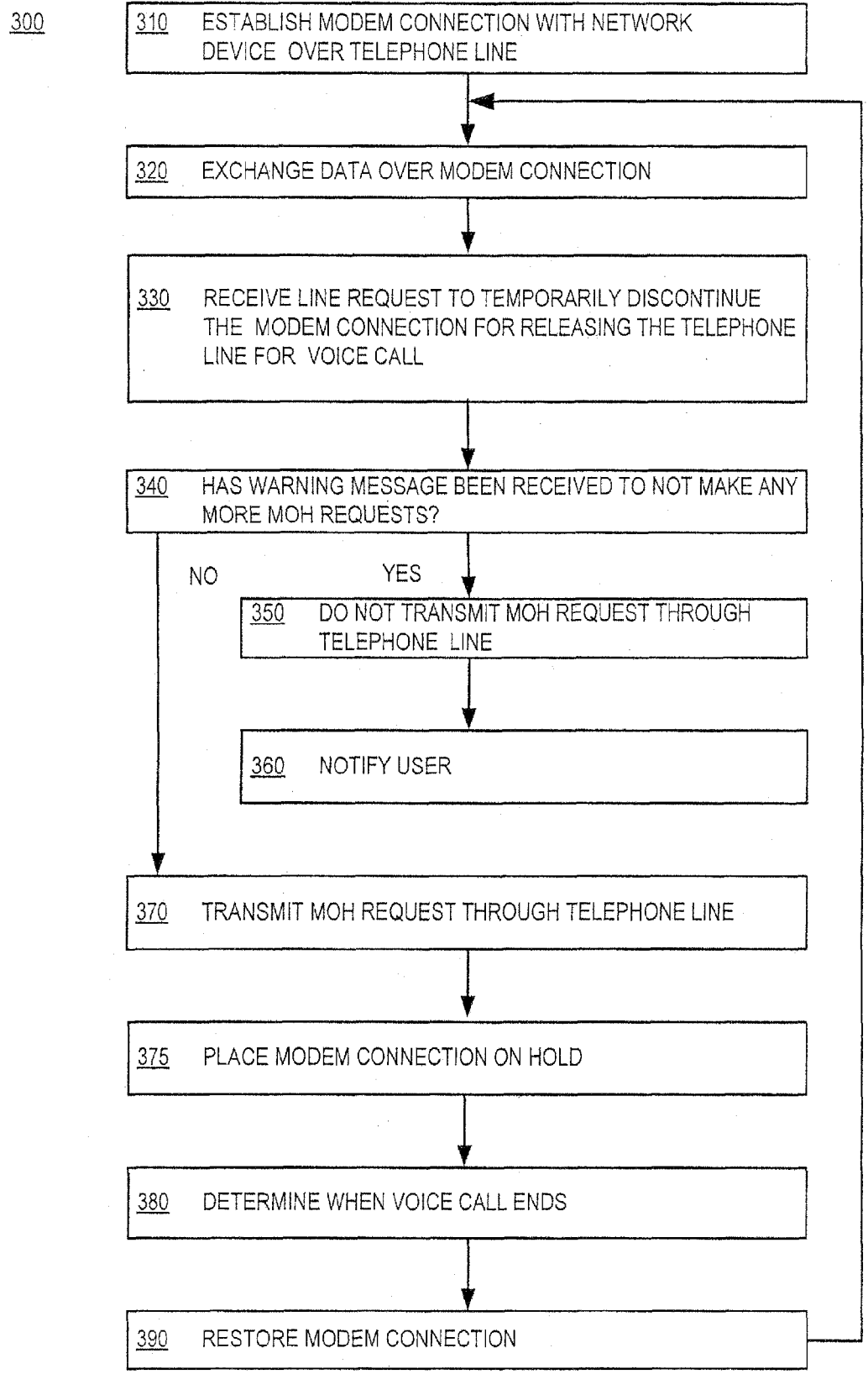
FIG. 3 is a flowchart illustrating a method according to another embodiment of the invention.

Referring now to FIG. 3, a flowchart 300 is used to illustrate a method according to another embodiment of the invention. The method of flowchart 300 may also be practiced by host device HD of FIG. 1A.

According to a box 310, a modem connection is established with a network device over a telephone line. This starts a log-in session.

According to an optional next box 320, data is exchanged with the network device over the modem connection.

According to an optional next box 330, a line request is received to transmit to the network device a new MOH request. This will have the effect of temporarily discontinuing the modem connection for releasing the telephone line.

According to an optional next box 340, it is inquired whether a warning message has been received to not make any more MOH requests. If yes, then according to a next box 350 the new MOH request is not transmitted over the telephone line. That is responsive to having received the warning message of box 340, notwithstanding having received the line request of box 330. Then according to an optional next box 360, the user is notified accordingly.

If at box 340 a warning message has not been received, then according to an optional next box 370, the new MOH request is transmitted through the telephone line.

According to a next box 375, the modem connection is placed on hold.

According to an optional next box 380, it is determined when the voice call ends.

According to an optional next box 390, the modem connection is restored. Execution then returns to box 320.

Referring now to FIG. 4, an implementation of the invention is shown. An extra entry is made in the MOH "Information bits" field, to communicate to the client modem not to send more requests for a particular modem session, as these additional requests will be denied by the server.

The table of FIG. 4 shows the changes made to the current definition of this table. There is no change to the current V.92 modem-on-hold implementation, if the server simply denies the request for modem-on-hold (reason for denial: "Modem on Hold denied. Try again later").

But if the server will not accept subsequent "requests" because the cumulative hold period for the current session has been exceeded, then the Mhnack sequence is accompanied by a new value in the "information bits" field. The client modem should understand this new value (or reason for denial) as subsequent requests will be denied until the current modem session terminates.

Reason for denial in bits 16-19 for Mhack should be interpreted by the requesting modem as follows:

0111 The current request for modem-on-hold has been denied. The modem may ask for another modem-on-hold request later.

0101 The current request for modem-on-hold has been denied. Future requests for modem-on-hold will also be denied, therefore, the modem should not make another modem-on-hold request due to an outgoing call request during this session.

In order to avoid continuous retrains or a session disconnect, the client modem should not request a modem-on-hold event through out the remainder of the current modem session. This procedure can also be applied in the opposite case of server requesting modem-on-hold.

A person skilled in the art will be able to practice the invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A method comprising:
   establishing, by a modem, a modem connection;
   receiving, by a processor, an on-hold request over the modem connection;
   comparing, by the processor, a cumulative time that the modem connection has been on hold to a threshold value; and
   resolving, by the processor, the on-hold request based upon the comparison;
   wherein resolving the on-hold request comprises denying the on-hold request when the cumulative time is at least as large as the threshold value.

2. The method of claim 1, wherein resolving the on-hold request comprises granting the on-hold request when the cumulative time is less than the threshold value.

3. The method of claim 1, further comprising transmitting to the modem a warning message that a subsequent on-hold request will be denied.

4. The method of claim 1, wherein comparing the cumulative time to the threshold value comprises:
   tracking the cumulative time with a timer; and
   comparing a value stored in the timer with the threshold value.

5. The method of claim 4, further comprising restarting the timer when the cumulative time is less than the threshold value.

6. The method of claim 1, wherein comparing the cumulative time to a threshold value comprises:
   receiving information to identify a user; and
   finding the threshold value associated with the user.

7. A device comprising:
   means for establishing a modem connection over a network;
   means for receiving a request to place the modem connection on hold;
   means for processing the request based upon a threshold value and a cumulative time that the modem connection was previously on hold; and
   means for receiving information that identifies a user of the modem connection; and
   means for determining the threshold value corresponding to the identity of the user.

8. The device of claim 7, the processing means comprising means for placing the modem connection on hold after determining that the cumulative time is no greater than the threshold value.

9. The device of claim 7, the processing means comprising means for denying the on-hold request after determining that the cumulative time is greater than the threshold value.

10. The device of claim 9, further comprising means for transmitting a warning message that a subsequent request to place the modem connection on hold will be denied.

11. The device of claim 7, wherein the processing means comprises:
    means for tracking the cumulative time; and
    means for comparing the cumulative time to the threshold value.

12. The device of claim 11, wherein the processing means further comprises means for restarting the tracking means after determining that the cumulative time has not exceeded the threshold value.

13. An apparatus comprising:
    a modem for coupling to a network; and
    a processor coupled with the modem, the processor adapted to
      communicate with a network device using a modem connection, the network device coupled to the network,
      receive from the network device an on-hold request over the modem connection,
      determine a cumulative time that the modem connection has been on hold,
      grant the on-hold request after determining that the cumulative time is less than the threshold value, and
      respond to the on-hold request based upon a relationship between the cumulative time and a threshold value.

14. The apparatus of claim 13, the processor further adapted to deny the on-hold request after determining that the cumulative time is approximately the same or greater than the threshold value.

15. The apparatus of claim 14, the processor further adapted to transmit to the network device a warning message that a subsequent on-hold request will be denied.

16. The apparatus of claim 13, further comprising a timer that is adapted to record the cumulative time.

17. The apparatus of claim 16, the processor configured to restart the timer when the cumulative time is less than the threshold value.

18. The apparatus of claim 13, wherein the processor is further adapted to receive information that identifies a user of the modem connection and to look up data about the user to determine the threshold value.

* * * * *